(12) United States Patent  
Ricky

(10) Patent No.: US 9,604,136 B1  
(45) Date of Patent: Mar. 28, 2017

(54) GOLF CLUB SIMULATION APPARATUS

(71) Applicant: Brett Ricky, Overland Park, KS (US)

(72) Inventor: Brett Ricky, Overland Park, KS (US)

( * ) Notice: Subject to any disclaimer, the term of this patent is extended or adjusted under 35 U.S.C. 154(b) by 0 days.

(21) Appl. No.: 15/182,146

(22) Filed: Jun. 14, 2016

Related U.S. Application Data

(63) Continuation-in-part of application No. 14/613,160, filed on Feb. 3, 2015.

(60) Provisional application No. 61/935,064, filed on Feb. 3, 2014.

(51) Int. Cl.
*A63F 13/245* (2014.01)
*A63F 13/812* (2014.01)
*A63F 13/211* (2014.01)

(52) U.S. Cl.
CPC .......... *A63F 13/245* (2014.09); *A63F 13/211* (2014.09); *A63F 13/812* (2014.09)

(58) Field of Classification Search
CPC . A63B 2060/0081; A63B 60/26; A63B 60/54; A63B 59/00; A63B 59/20; A63B 59/40; A63B 59/60–59/80; A63F 13/245; A63F 13/211; A63F 13/812
See application file for complete search history.

(56) References Cited

U.S. PATENT DOCUMENTS

| 2008/0261715 A1* | 10/2008 | Carter | A63B 53/0466 473/291 |
| 2010/0093458 A1* | 4/2010 | Davenport | A63B 53/0466 473/223 |

* cited by examiner

*Primary Examiner* — William H McCulloch, Jr.
*Assistant Examiner* — Cathy Zhang
(74) *Attorney, Agent, or Firm* — Dale J. Ream

(57) ABSTRACT

A golf club simulation apparatus includes an elongate shaft housing having opposed lower and upper ends and defining an interior area. A head housing is coupled to the lower end of the shaft housing. A battery is situated in the shaft housing. An input member configured to receive club selection data is coupled to an outer surface of the shaft housing and electrically connected to the battery. A weight indexing assembly is situated in the head housing that includes a tumbler rotatably coupled to the lower portion of the shaft housing and that includes a weight carriage situated in the club head housing. The tumbler has an outer surface defining an indexed slot network, the weight carriage being in communication with the indexed slot network and configured for movement along the indexed slot network in a gravity assisted movement.

35 Claims, 12 Drawing Sheets

GOLF CLUB SIMULATION APPARATUS

REFERENCE TO RELATED APPLICATIONS

This application claims the benefit of U.S. Ser. No. 14/613,160, filed Feb. 3, 2015 entitled Golf Club Simulation Apparatus which claims the benefit of provisional patent application U.S. Ser. No. 61/935,064 filed Feb. 3, 2014 titled Golf Club Simulation Apparatus, said prior applications being incorporated in their entireties, respectively.

BACKGROUND OF THE INVENTION

This invention relates generally to sporting device simulators and, more particularly, to a golf club simulation apparatus that provides a realistic golfing experience using a single miniaturized length golf club. More particularly, the single golf club includes electromechanical assemblies that simulate an entire set of golf clubs.

Although golf is a popular game, the number of people actually playing real golf on a golf course has stagnated in recent years for a number of reasons, including (1) the difficulty of the game without significant practice or game play, and (2) the significant amount of time required for learning proper swing techniques. Simply playing casual video games with traditional interfaces (such as with mouse clicks and joysticks) does not teach realistic swing technique that will encourage gamers to develop actual game skills and then to go out and play the game.

It is well known that a standard set of golf clubs includes clubs having different lengths, weights, grip size, bend characteristics, drag resistance, swing speed, and other parameters. It is very difficult to practice swinging a full set of golf clubs without owning and using a literal full set of clubs in an outdoor environment. It is not feasible to practice with real clubs in an interior environment.

Electronic games can be played in different ways. For example, full golf simulation games ask the user to determine the course to be played, the target to his a shot, the club the user wants to hit and some other information and then lets the user execute on the swing with the variables selected. The present invention will work well with these golf games or simulation environments by selecting the variables with squeeze membrane switches or other movement commands such as shaking, bouncing, or moving of the device to chance command selections.

Further, traditional golf simulators have attempted to simulate a golf game through computer software and even using a hand-held device in the nature of a wand. Although assumably effective for their intended purposes, the existing devices focus on the visual representations of respective golf courses, hypothetical wind and geographic conditions, and timing of swinging a simulated golf club. The existing golf simulation products do not enable a user to feel and experience the actual length, weight, swing speed/resistance, and impact of actually striking a golf ball. For instance, casual video games, such as on smart phones, online games, and console games, are not effective to teach real golf game skills or to encourage gamers to actually play the game with real golf clubs. Conversely, golf swing training devices require the use of real clubs along with optic technologies including cameras.

The market for sports related video gaming systems is enormous—including an estimated 100 million gamers. Therefore, it would be desirable to have a simulation apparatus and system that actually influences gamers to actually try a sport and train the user regarding the skills and techniques of the sport. Specifically, it would be desirable to have a golf club simulation apparatus that combines the thrill of sports simulation with the physical experience of actually swinging a real golf club. Further, it would be desirable to have a golf club simulation apparatus that is able to change its weight distribution and shaft flexibility/bend so as to simulate the actual feel of selected clubs. In addition, it would be desirable to have a golf club simulation apparatus that trains a user the proper angle of shaft orientation for each of a selectable number of clubs while using only a fixed length club (or a limited variable length club) which allows for swinging indoors without ceiling height restrictions.

SUMMARY OF THE INVENTION

A golf club simulation apparatus according to the present invention has a goal of changing the way people interact with casual games on mobile devices, console games, and the like, and to influence gamers to actually engage in a sport. The present invention will be useful with thousands of IOS, Android, and Console games that exist today by incorporating the ball flight model, real club feel, club position angle sensor, ball impact sensation, and other haptic features—all of which will be described below. The golf club simulation apparatus is designed to interact with two visual mediums: (1) an onboard display screen, and (2) a game platform on a remote electronic device, such as an IOS, Android, tablet, consoles, personal computer, laptop, cloud based games, and the like. The golf club simulation apparatus may communicate with both visual mediums via wireless communications such as Bluetooth.

Specifically, an object of this invention is to "Turn Gamers into Golfers". The apparatus according to the present invention is intended to replace traditional video game controllers such as joy sticks with minor haptic responses (vibration or sound), a computer mouse, mobile touch screen interfaces, and even cameras such as the Wii™. Existing game interfaces do not have a realistic feel interactive interface.

The present apparatus allows for home use so that beginners can play a little and come back often without having to have dedicated travel and golf driving range humiliation. In addition, the avid golfers in the US (about 6.2 million) can use the present apparatus inside and outside and the feedback will allow them to make swing changes, practice and improve.

Specifically, a golf club simulation apparatus according to one embodiment of the present invention includes an elongate shaft housing having opposed lower and upper ends and defining an interior area therebetween. The apparatus includes an elongate grip member having a proximal end operatively coupled to the upper end of the shaft housing and a distal end opposite the proximal end, the grip member defining an interior chamber. A head housing is coupled to the lower end of the shaft housing and defines an open space. A battery is situated in the head housing. An input member is coupled to an outer surface of the shaft housing and electrically connected to the battery, the input member being configured to receive club selection data.

An electronics module may include an inertial measurement unit ("IMU") for detecting acceleration motion, angular movements, and an optics assembly to optimally calculate a moment of impact and to predict a virtual trajectory of a virtual golf ball or other hypothetical object. A haptic member, such as a vibration or sound element is positioned in the shaft housing and actuated to simulate a ball impact when the shaft housing is indicative of a swing. A weight indexing assembly may be electrically connected to the input member and includes a weight carriage movable along an indexed slot network defined by a rotatable tumbler facilitates weight distribution with a head housing so as to simulate club size selections.

It is understood that the technology presented herein may include a software development module or kit that will be integrated into existing and future electronic gaming systems.

Therefore, a general object of this invention is to provide a golf club simulation apparatus that combines the experience of swinging a real golf club with the enjoyment of a video game that simulates a round of golf.

Another object of this invention is to provide a golf club simulation apparatus, as aforesaid, that provides a fixed length golf club having structures that selectively change the weight distribution, shaft flexibility, and required shaft angular orientation so as to simulate swinging a selected golf club.

Still another object of this invention is to provide a golf club simulation apparatus, as aforesaid, in which the golf club simulates an impact with a golf ball when making a golf swing of the club, such as with haptic elements such as vibrations and sound.

Yet another object of this invention is to provide a golf club simulation apparatus, as aforesaid, that enables a user to select a desired club audibly, manually, or by positioning the apparatus at a selected angle that is recognized by an inertial measurement unit.

A further object of this invention is to provide a golf club simulation apparatus, as aforesaid, in which the golf club includes a bend variability assembly that simulates the normal bending of a selected golf club shaft when swinging a golf club.

A still further object of this invention is to provide a golf club simulation apparatus, as aforesaid, having angle and speed sensors configured to collect data on an actual swing of the golf club.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 2b is a side view of the golf club simulation apparatus as in FIG. 2a;

FIG. 2c is a sectional view taken along line 2c-2c of FIG. 2a;

FIG. 5b is a side view of the weight carriage as in FIG. 5a;

FIG. 6b is a side view of the input assembly as in FIG. 6a;

FIG. 7b is a top view of the tumbler motor as in FIG. 7a;

FIG. 8b is a top view of the indexing gear as in FIG. 8a;

FIG. 9b is a perspective view of the grip member as in FIG. 9a;

FIG. 9c is a bottom side view of the grip member as in FIG. 9a;

DESCRIPTION OF THE PREFERRED EMBODIMENT

Figure 1:
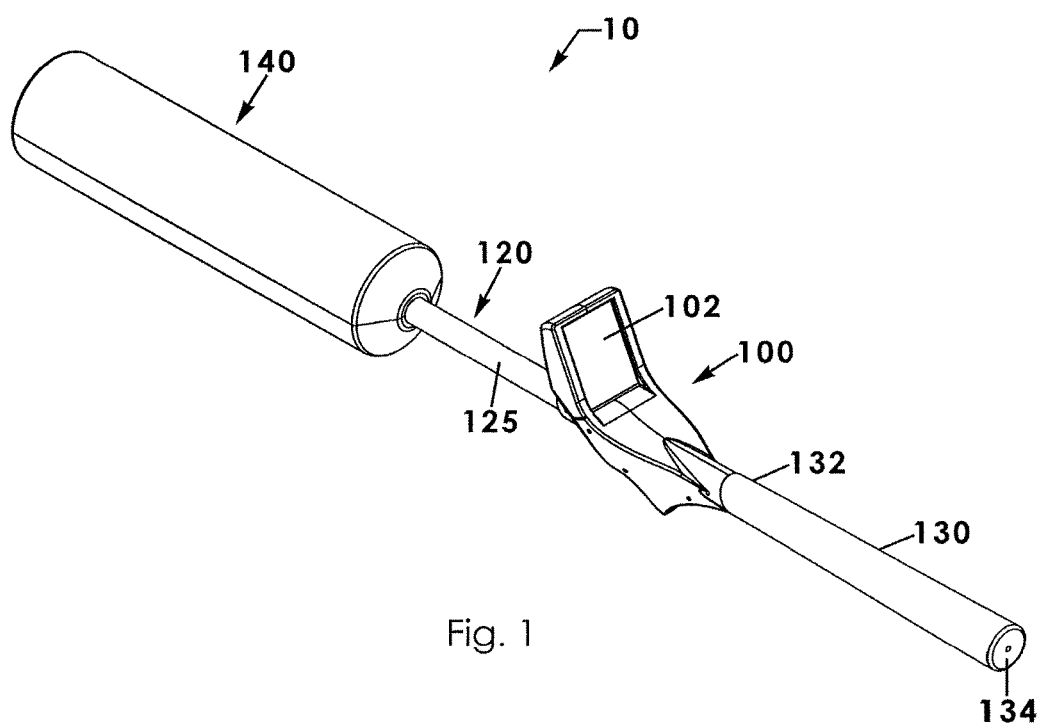
FIG. 1 is a perspective view of a golf club simulation apparatus according to a preferred embodiment of the present invention.
Figure 2A:
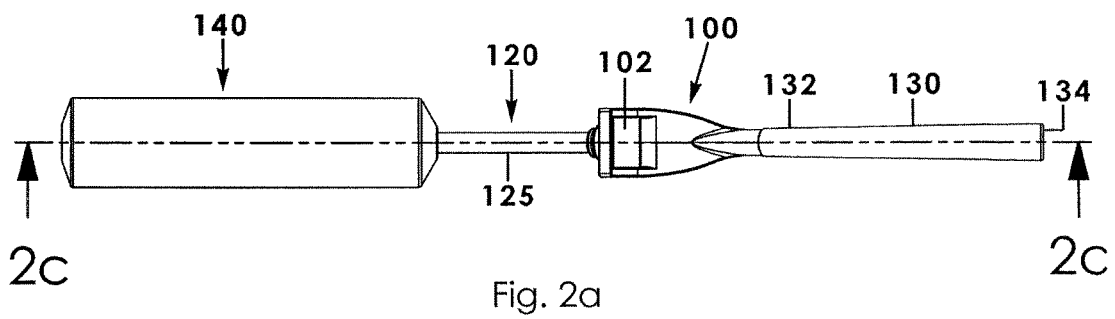
FIG. 2a is a top view of the golf club simulation apparatus as in FIG. 1.
Figure 2C:
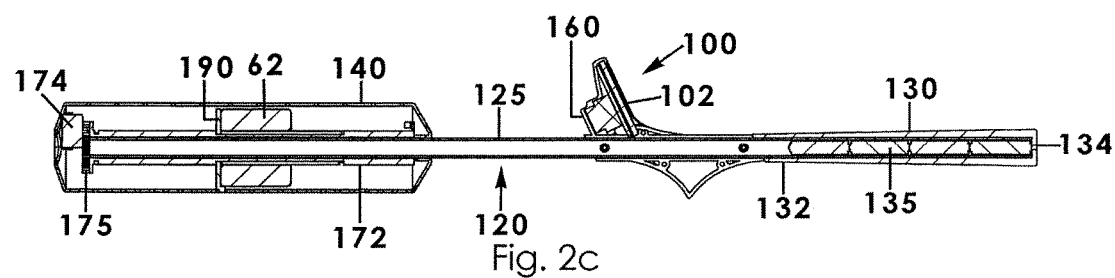
Figure 2B:
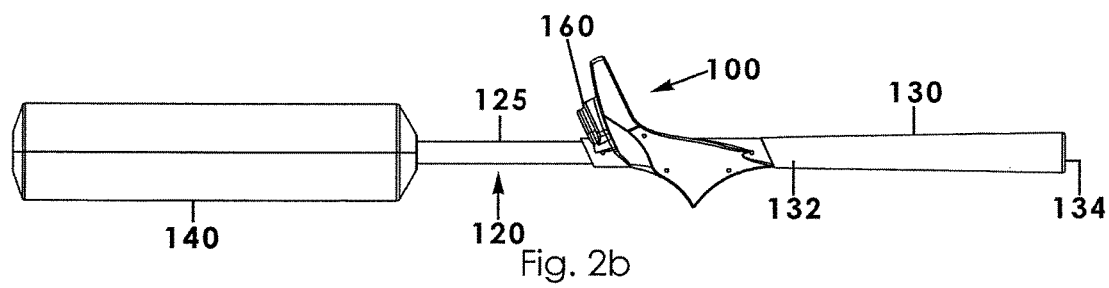
Figure 2D:
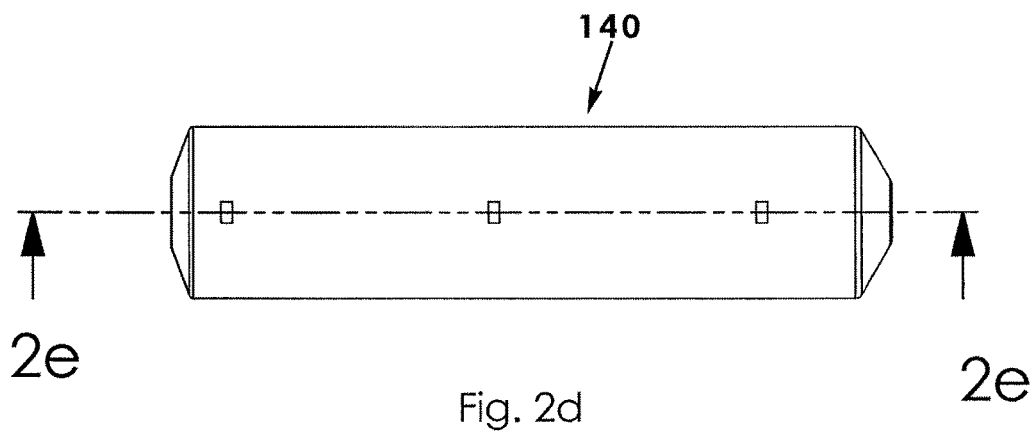
FIG. 2d is a top view of the head housing as in FIG. 1.
Figure 2E:
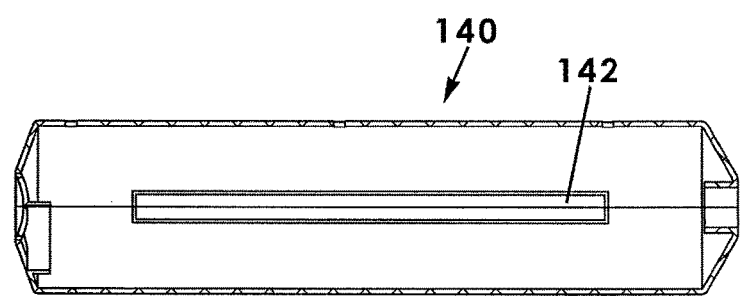
FIG. 2e is a sectional view taken along line 2e-2e of FIG. 2d.

A golf club simulation apparatus according to a preferred embodiment of the present invention will now be described in detail with reference to FIGS. 1 to 12b of the accompanying drawings. In an embodiment, the golf club simulation apparatus 10 includes a shaft housing 120, a grip member 130, a club head housing 140, an electronics module 160 having an inertial measurement unit (IMU) 161, and a weight indexing assembly 170 having a tumbler 172 and weight carriage 190.

Figure 3:
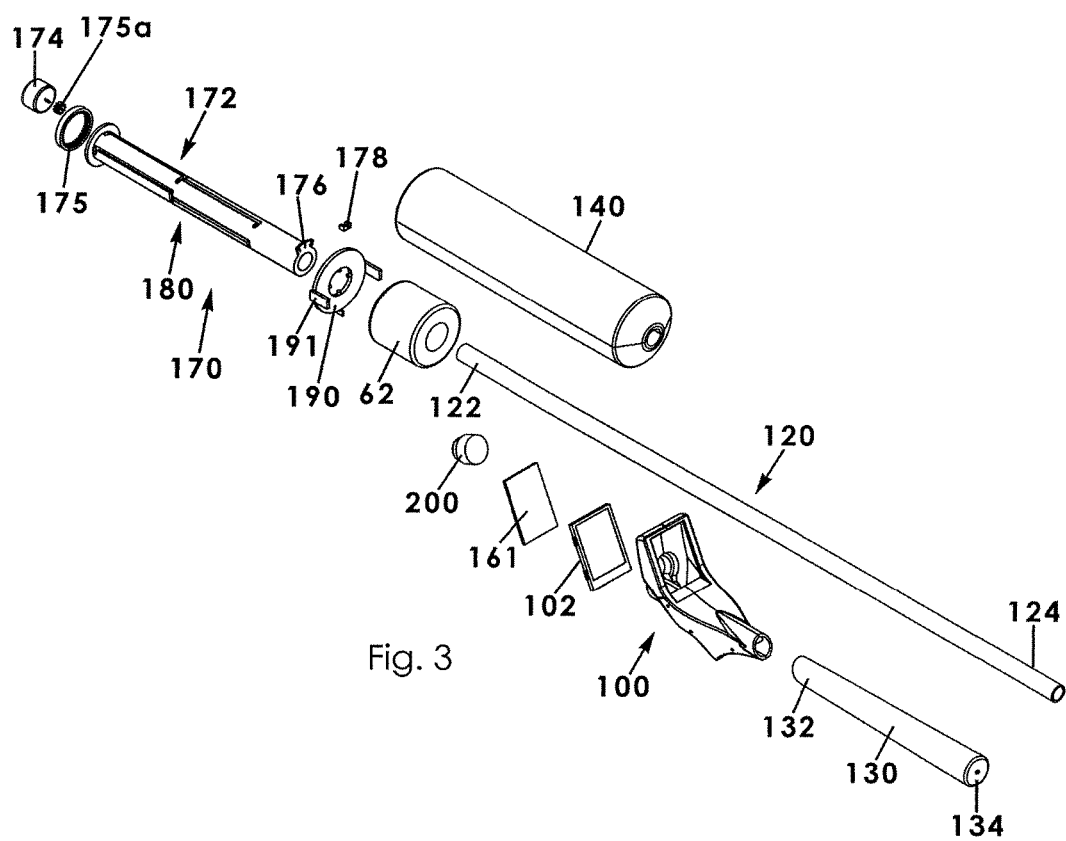
FIG. 3 is an exploded view of the golf club simulation apparatus as in FIG. 1.
Figure 4A:
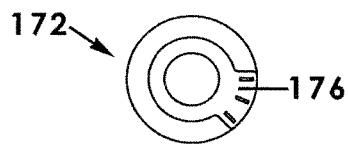
FIG. 4a is a top view of an indexed slot assembly as in FIG. 3.
Figure 4B:
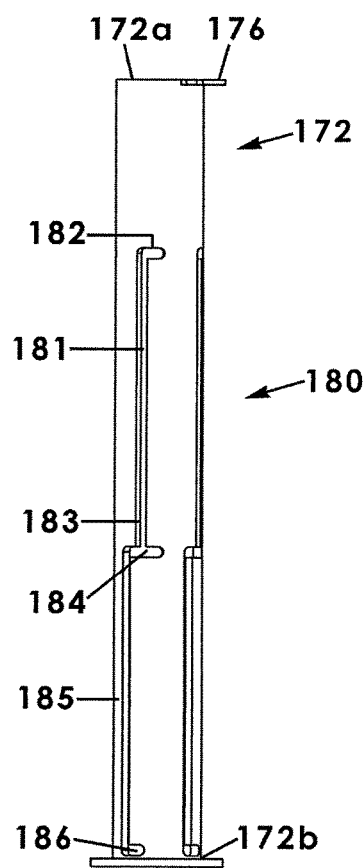
FIG. 4b is a side view of the weight indexing assembly as in FIG. 3.
Figure 4C:
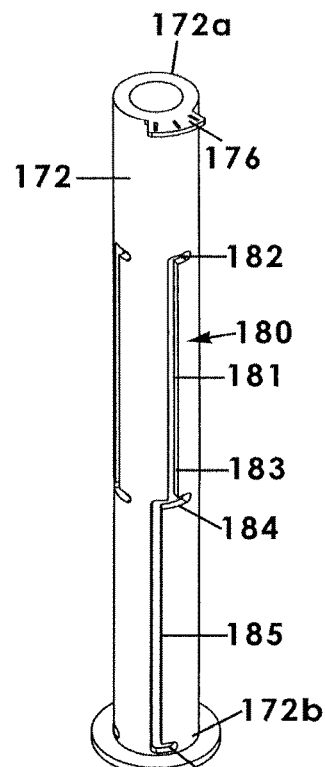
FIG. 4c is a perspective view of the weight indexing assembly as in FIG. 4b.
Figure 5A:
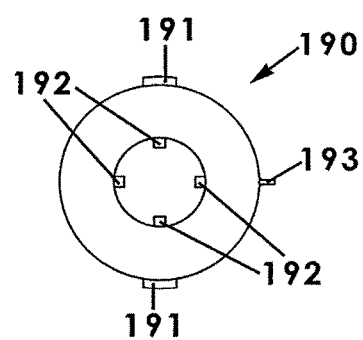
FIG. 5a is a top view of a weight carriage as from FIG. 3.
Figure 5C:
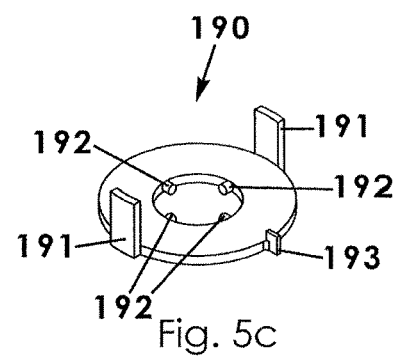
FIG. 5c is a perspective view of the weight carriage as in FIG. 5b.
Figure 5B:
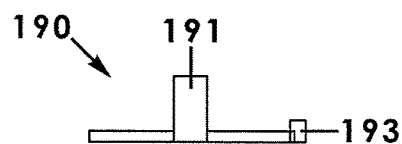
Figure 6A:
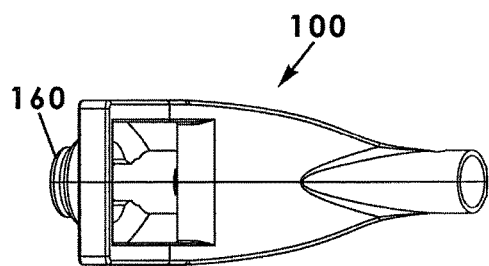
FIG. 6a is a top view of an input assembly as in FIG. 3.
Figure 6C:
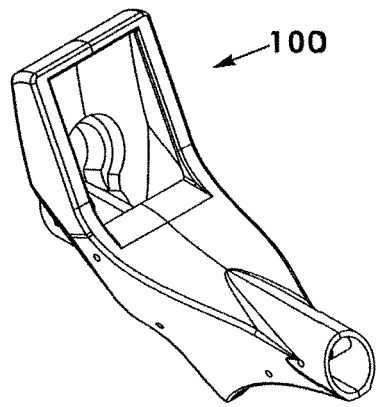
FIG. 6c is a perspective view of the input assembly as in FIG. 6b.
Figure 6B:
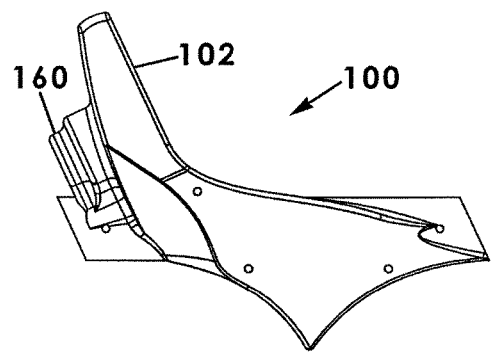
Figure 7A:
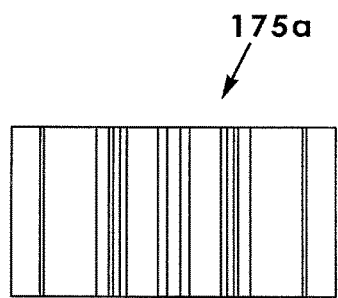
FIG. 7a is a side view of a tumbler motor as in FIG. 3.
Figure 7C:
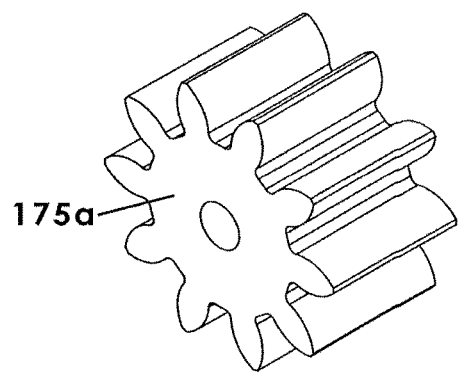
FIG. 7c is a perspective view of the tumbler motor as in FIG. 7b.
Figure 7B:
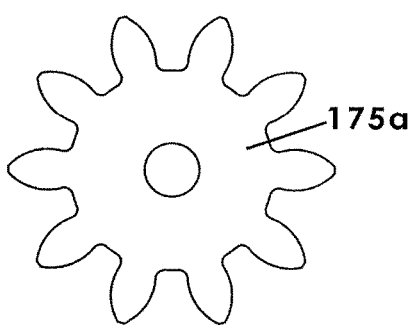
Figure 8A:
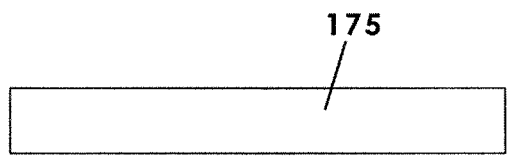
FIG. 8a is side view of an indexing gear as in FIG. 3.
Figure 8C:
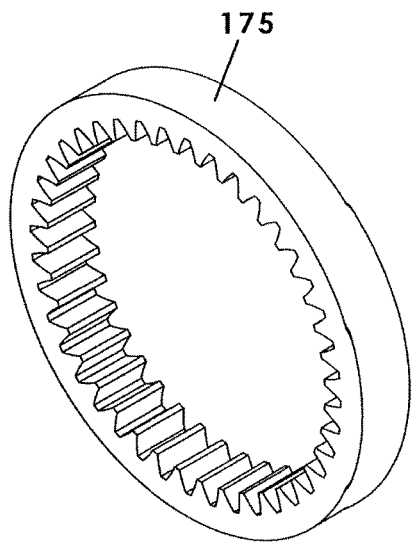
FIG. 8c is a perspective view of the indexing gear as in FIG. 8b.
Figure 8B:
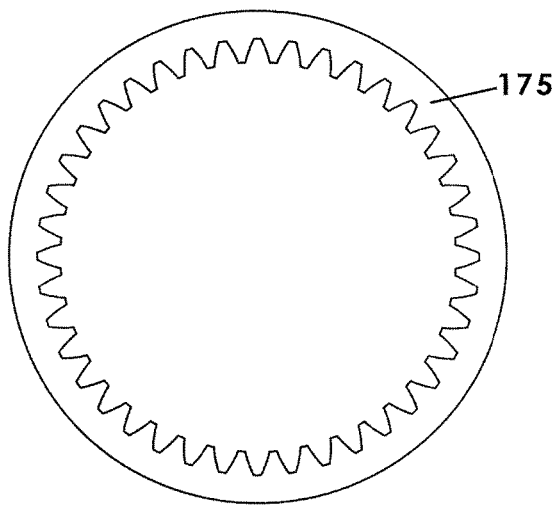
Figure 9B:
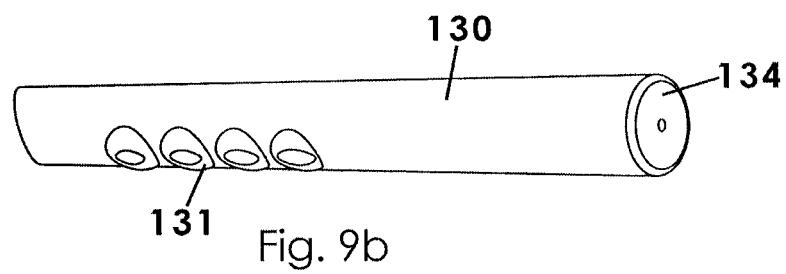
Figure 9A:
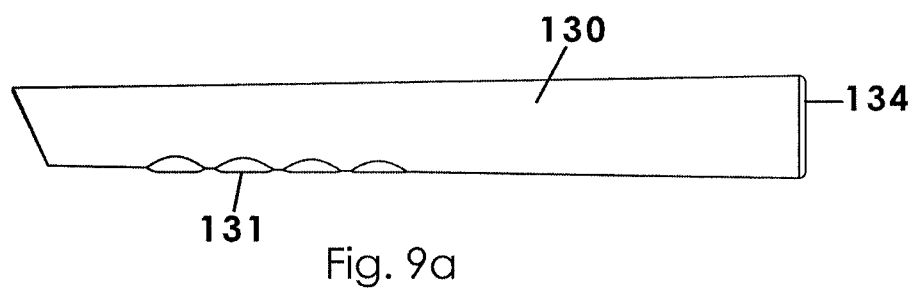
FIG. 9a is a side view of the grip member as in FIG. 3.
Figure 9C:
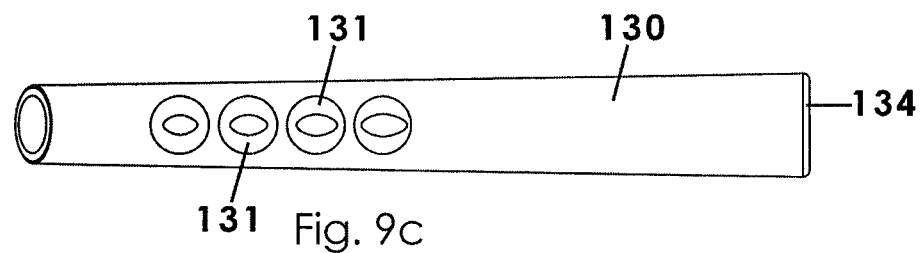
Figure 10:
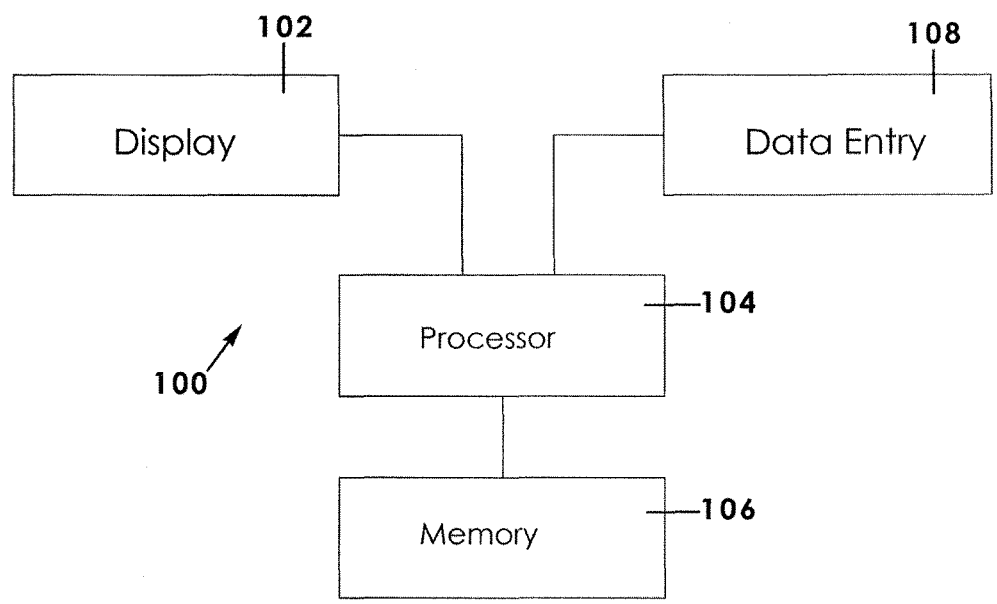
FIG. 10 is a block diagram of an input assembly according to the present invention.
Figure 11:
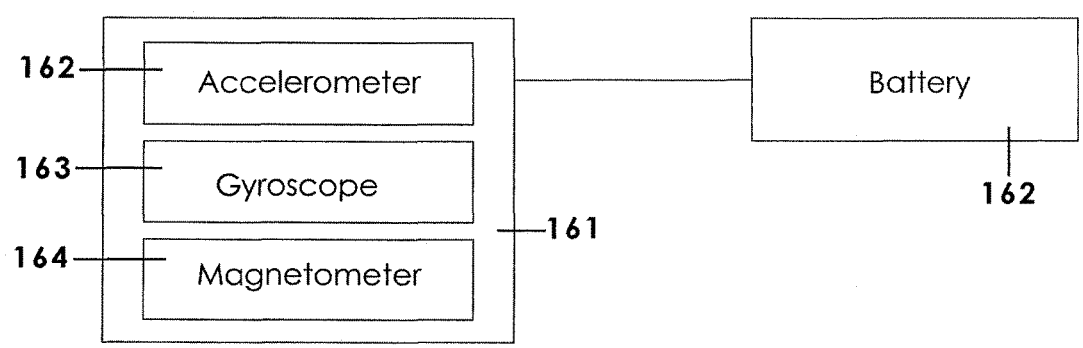
FIG. 11 is a block diagram of an inertial measurement unit (IMU) according to the present invention.

The elongate shaft housing 120 includes opposed lower 122 and upper 124 ends (FIG. 3). The shaft housing 120 defines an interior area between upper and lower ends such that other assemblies and electronics may be positioned therein as will be described later. The shaft housing 120 may also include a channel coupled to an inner or outer surface of the shaft housing 120 and extending longitudinally, the channel being configured to receive wires electrically connecting respective electronic components, battery 62, and respective motors. In other embodiments, electrical communications may be with wireless technology, such as that known as Bluetooth. Preferably, the battery 62 is a rechargeable, six-hour battery.

The grip member 130 includes a proximal end 132 operatively coupled to the upper end 124 of the shaft housing 120 and a distal end 134 opposite the proximal end 132. The grip member 130 may define an interior chamber 135 configured to receive other components. The grip member 130 may include a construction substantially similar to a grip of a traditional golf club in its appearance and tactile characteristics. It is understood that the shaft housing 120, grip member 130, head housing 140, and other related structural components will preferably have symmetrical configurations that may be used equally efficiently by either left or right handed users.

A tactile membrane switch 131 (or an array of membrane switches) may be coupled to the grip member 130 and configured to receive user input data as a user's hands grip the grip member 130. The membrane switch 131 is in data communication (via wires or wireless) with the input assembly as will be described later.

In an embodiment, the golf club simulation apparatus 10 may include a microphone that is positioned within the interior chamber 135 of the grip member 130. Preferably, the microphone is coupled to the distal end 134 of the grip member 130 and is partially situated inside the interior chamber 135 and partially extends from the distal end 134 or is otherwise in communication with the distal end 134, such as through an aperture defined by the distal end 134. The microphone is at least electrically connected to a digital display positioned along the shaft housing 120 or to associated circuitry or processor. In operation, the microphone is configured to receive audible club selection input data from a user and to translate the input data to the display. It is understood that voice recognition software or circuitry may be included as well in order to accurately translate a user's voice command to a meaningful club size indicator to be published by the display. Determining a user's club selection is critical in order to actuate changes in weight distribution, shaft bend variation, and the like as will be described later. In one embodiment, a speaker may be also be positioned in the interior chamber of the grip member 130 and electrically connected to the microphone so as to audibly confirm the audibly spoken club request or a club requested through input buttons.

In embodiment, a multi-functional input member 100 may be coupled to an outer surface of the shaft housing 120 (FIGS. 1 and 2a to 2c). The input member 100 includes a digital display 102 on which may be displayed a club selection, a trajectory of a virtual ball strike, club options, and the like. Further, the input member 100 may include a data entry component such as one or more buttons, a keypad, touch screen elements, a dial, or the like, with which club selections may be made by a user. The input member 100 may include circuitry or, preferably, a processor 104 that executes programming instructions stored in a non-transient memory 106, the processor 104 and memory 106 being situated in the input member 100. The processor 104 may be coupled to the digital display 102 and, executing programming, provide a graphic user interface that enables a user to enter club selection data using the data entry component. Predetermined data regarding golf club size, weight, other club characteristics, user selection data, and the like may be stored in the memory 106.

The golf club simulation apparatus 10 includes an electronics module 160 coupled to the shaft housing 120 and to the processor 104 or control circuitry. The electronics module 160 includes an inertial measurement unit ("IMU") 161 having an accelerometer 162, gyroscope 163, and magnetometer 164. The IMU 161 is configured to analyze many parameters in real time when the club is swinging, such as, but not limited to, swing speed, angular velocity, the weight variation settings (to be described later), air resistance/drag for a selected club, or the like. More particularly, the accelerometer 162 is configured to detect a rate of acceleration, for example, the motion of the swing of the shaft housing 120, and to generate acceleration data. The gyroscope 163 is configured to detect rotational movement, for example, the angular motion of the shaft housing 120. The accelerometer 162 and gyroscope 163 can each provide 3 distinct channels of data in the x, y, z axis of real world motion. Therefore, six (6) distinct attributes of motion can be represented with just those two components. For example, a dual-axis (2-axis) solid state accelerometer can be used to detect acceleration in 2 directions versus a triple axis accelerometer (3 axis) accelerometer may be used to detect acceleration forces in three dimensions (x, y, and z axis of motion). Further, solid state combinations of accelerometers, gyroscope, and magnetometers may be employed to provide maximum position and motion data.

The captures can be broken down into both translational and rotational movement. Translational movement refers to up/down, left/right, forward/backward movement. Rotational movement refers to pitch, roll, and yaw. The accelerometer measures non-gravitational acceleration forces in the translational movement. The relationship of each coordinate (x, y, z) to the force of the gravity constant of 9.8 m/s$^2$ will also detect if the object is straight up and down or tilted along one of the other axes.

Unlike the accelerometer 162, the gyroscope 163 can measure rotational forces so it measures the speed of rotation around an axis, also called angular velocity. It measures the degrees of rotation per second or the revolutions per second around an axis. It is not concerned with the translational movement of the object so if one could theoretically hold a wheel perfectly still on all its axes but ran around the room with it, it would not register any change of the angular velocity.

The magnetometer 164 is configured to generate overall spatial orientation and to generate orientation data. The magnetometer is configured to calibrate the IMU by verifying, confirming, or otherwise correcting errors generated by the accelerometer and gyroscope. The magnetometer is in essence there to provide a means to reduce the error that can be present in the other sensor. It is not measuring a "new" axis that the other two sensors miss but rather, it allows for the fusion of the sensors to provide the opportunity for a better accuracy outcome.

The IMU data generation is important in that the IMU 161 can determine the at-rest angle of the shaft housing 120 as well as the in-motion position. Predetermined club data stored in memory is associated with corresponding angles of the shaft housing 120. Accordingly, the IMU 161 is capable of determining a user's club selection by the angle of the housing 120. The current selection may be published to the display 102 as described above so as confirm the user's selection or to give further opportunity to change the selection. Operation of the IMU 161 in this manner is a possible means by which a user inputs data indicative of club selection. In other words, the gyroscope 163 is capable of determining the initial (at rest) spatial position of the shaft housing 120, i.e. a "Starting Position," and, only when in a correct position, may publish a confirmation to the display 102 or, alternately, energize respective LEDs to illuminate so as to indicate the club is ready to swing.

In operation, the accelerometer 162 or gyroscope 163 is configured to analyze many parameters in real time when the club is swinging, such as, but not limited to, swing speed, angular velocity, the weight variation settings (to be described later), air resistance/drag for a selected club, or the like. In addition, a gyroscope 163 is capable of determining the initial (at rest) spatial position of the shaft housing 120 ("starting position") and, only when in a correct position, will actuate respective LEDs to illuminate so as to indicate the club is ready to swing. In an alternative embodiment described later, a proper shaft housing 120 angular position may be displayed as lights or other indicia on a digital display 102 rather than by LEDs.

The motion and rotational data from the IMU 161 described above may be analyzed by circuitry in the electronics module 160 so as to determine a virtual trajectory of a hypothetical golf ball (image target), i.e. the virtual ball path, struck by the head housing 140. Circuitry in the electronics module 160 may then cause the trajectory data to be graphically displayed on the digital display 102 of the input member 100. In an embodiment, motion data and angle data from respective sensors in the electronics module 160 may be transmitted to the processor 104 in the input member 100 as described previously. The data may be delivered through wires or wirelessly. The processor 104 is electrically connected to the digital display 102 and, executing programming, the trajectory of a virtual ball or other virtual target struck by the head housing 140 as a result of a swing of the shaft housing 120 may be displayed upon the digital display 102. Calculating trajectory may include parameters relating to ball spin, speed, launch angle, dynamic loft, and the like. Using wireless signal transmission, such as Bluetooth, the trajectory or other swing statistics may be transmitted to a remote device such as a laptop computer, remote display screen, or other remote electronic device.

Although satisfactory for providing a "generally accurate" trajectory, the motion and rotational data supplied by the IMU 161 may not be entirely accurate to calculate a true trajectory that depends on how the virtual ball (or other virtual object) would actually be impacted by the virtual swing. For instance, acceleration and angular data immediately before and immediately a "moment" of impact are critical to determining an actual and accurate trajectory of the virtual object, e.g. a golf ball.

Figure 12A:
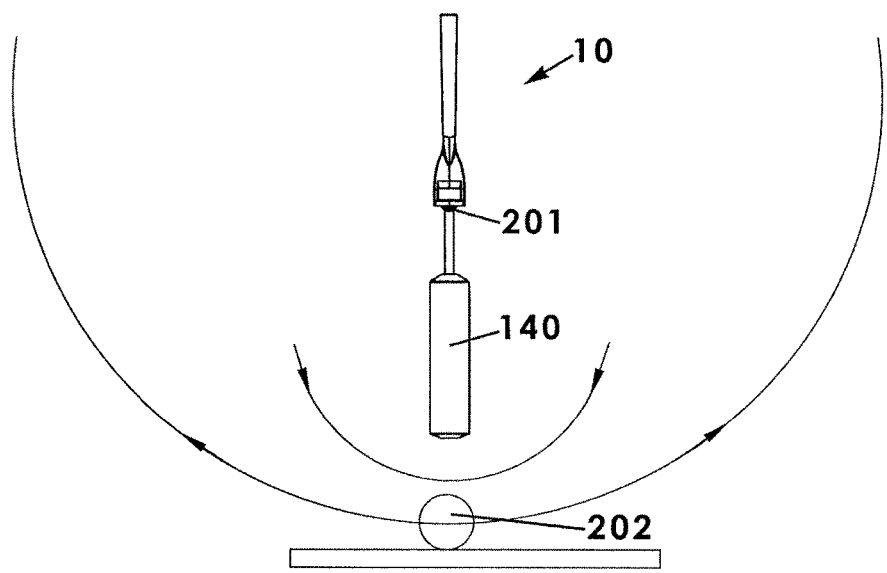
FIG. 12a is a diagrammatic view of the golf club simulation apparatus in use with an inertial measurement unit and optics assembly.
Figure 12B:
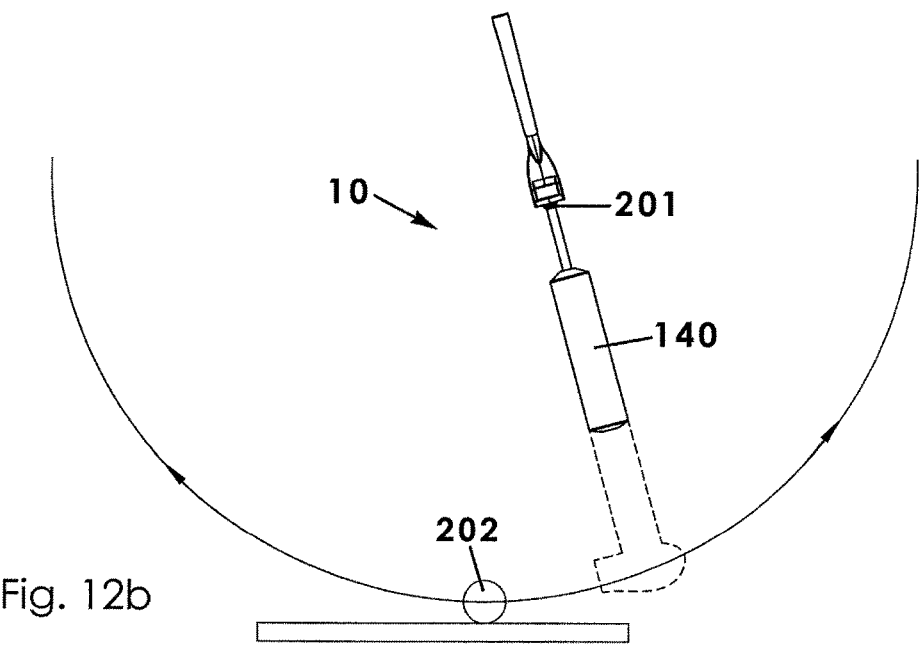
FIG. 12b is another diagrammatic view of the golf club simulation apparatus in use with an inertial measurement unit and optics assembly.

Therefore, the present invention may also include an optics assembly that is configured to supply the critical data of how the virtual club face of the head housing 140 addresses a tangible landmark representative of the moment of impact. The optics assembly includes an image sensor 201 in data communication with the IMU 161 described above and the processor 104 and includes an image target member 202 remote from the image sensor 201. Use of the optics assembly to determine the orientation of the head housing 140 relative to an image target member 202 is illustrated in FIGS. 12a and 12b. The image sensor 201 may be included in the electronics module 160 and directed to take pictures of the image target 202. In an embodiment, the image sensor 201 is a camera configured to take a predetermined number of snapshots ("frames") per second (which may be referred as "fps"). The image target 202 is a tangible device, such as a mat, ball, or other landmark, having a plurality of position indicia that, when captured by a respective snapshot by the image sensor 201 and communicated to the processor 104, is indicative of a "moment of impact" with the image target.

It is understood that snapshot of the position data of the image target may be represented mathematically and used with the IMU data described above to determine a more accurate trajectory of a virtual object. Specifically, the IMU data may be interpreted by the processor 104 executing programming instructions to detect when a swing of the shaft housing 120 is underway so as to actuate the optics assembly to generate optical data before and after the "moment of impact." Together, IMU data and data from the optics assembly allow the processor 104, via programming instructions, to more accurately determine a ball flight path or trajectory based on a swing of the shaft housing 120. As described above, the calculated trajectory may then be published to the display 102 for review by a user or may be communicated wirelessly to a remote device, such as a laptop, tablet, smart phone, etc.

It has been shown that that the correct position of the head and eyes greatly increases the opportunity for a good swing. With further reference to the input member 100 the digital display 102 may be configured to effectively mandate proper eye and head position of a user by only communicating with or being visible by a user when proper hand, foot, or head position is detected or demonstrated. In other words, the screen viewing angle can be restricted so it cannot be viewed until the user has their head and eyes in the best position to start their swing.

In addition, the digital display 102 may include a lenticular lens that makes the display visible only when viewing the digital display 102 at a predetermined angle. Alternatively, the digital display 102 may be configured to have a "limited view" such that the display 102 is hidden from view except at a predetermined angle. Requiring a user's head or hands to be properly positioned before the game device—in this case a golf club—is operable may be referred to as intuitive learning or "Restricted Angle Viewing" or RAV. The user "learns" quickly regarding the required grip, stance, head position, or other positional attributes are correct and which allow play to begin. The display 102 may be an LED or OLED screen configured to intuitively instruct the user on the correct starting position angle for shaft housing 120, their head, and their eyes at the beginning of each swing based upon the club selected. The screen can work in a way that based upon the club selected, the user views the screen and alters the beginning angle of shaft housing 120 until a message appears on the display 102 indicting that shaft housing 120 is in a desirable position to start. Applying this technology to games that are projectile oriented, the game itself could instruct a user on which club should be hit for the desired ball flight model to achieve the desired result.

Determining club selection and club motion/rotation is important in that the golf simulation apparatus 10 according to the present invention effectively shifts the weight distribution within the club to effectively simulate the selected club in motion. In an embodiment, this weight variation is implemented by a weight indexing assembly 170 having a tumbler 172 and a weight carriage 190 that is selectively movable relative to the tumbler 172. The head housing 140 is coupled to the lower end 122 of the shaft housing 120 and defines an open space such that the shaft housing 120 is partially situated inside the open space. Within the head housing 140, the shaft housing 120 acts as an axle about which other components are coupled and move along as will be described below.

More particularly, the tumbler 172 is rotatably mounted to the shaft housing 120 in the head housing 140. A tumbler motor 174 is coupled to a lower end of the head housing 140 and is operatively coupled to the tumbler 172 so as to rotate the tumbler 172 when energized. The tumbler motor 174 may be electrically connected to the battery 62 and selectively energized thereby. An indexing gear 175 and drive gear 175a may interface the tumbler motor 174 with the distal end 172b of the tumbler 172. The weight carriage 190 is coupled to the shaft housing 120 within the open space of the head housing 140 and is movable longitudinally along the shaft housing 120 but is not rotatable thereon.

The weight carriage 190 is configured to receive the battery 62 such that the battery 62 provides the weight that causes the weight carriage 190 to move as will be described below. The weight carriage 190 may include a flange 193 configured to removably secure the battery 62 to the carriage as well as to receive auxiliary weighted members to provide even more weight. It is understood that it is the weight of the weight carriage 190 as it moves along the shaft housing 120 and relative to the tumbler 172 that changes the weight distribution and "feel" of the golf simulation apparatus.

The head housing 140 includes an inner surface defining at least one groove 142 that extends longitudinally substantially between ends of the head housing 140. The weight carriage 190 includes a tab 191 or other fastener configured to engage or nest in the groove 142 of the head housing 140. The tab/groove combination enables the weight carriage 190 to move longitudinally along the shaft housing 120 but prevents rotational movement of the weight carriage 190. The weight carriage 190 may include a flange 193 for removably securing the battery 62 to the weight carriage 190 appropriately. Alternatively, the flange 193 may be used to engage optical switches (not shown) such that a position of the weight carriage 190 may be identified.

The tumbler 172 includes an outer surface that defines an indexed slot network 180 along which the weight carriage 190 is configured to travel along in a gravity assisted movement. Correspondingly, the weight carriage 190 includes a guide pin 192 or similar interface that is configured to engage the indexed slot network 180 so that the weight carriage 190 is movable along the indexed slot network 180.

The indexed slot network 180 includes a series of interconnected slot segments along which the weight carriage 190 may travel by the powerful pull of gravity, i.e. without the requirement of motor control. The indexed slot network 180 is "indexed" in the sense that the weight carriage 190 may follow a longitudinal track segment but may be stopped by a T-slot (also referred to as a "locking slot") that may correspond with a club selection. However, the weight carriage 190 may follow the T-slot to another longitudinal segment to be followed so as to simulate a next club selection, and so on, until a T-slot segment representing a selected club selection is reached.

Now with more particularity, the indexed slot network 180 defines a first slot segment 181 (also referred to as a "vertical slot") having a first end 182 proximate a proximal end 172a of the tumbler 172 that extends in the direction of a distal end 172b of the tumbler 172 to a second end 183 opposite the first end 182. The indexed slot network 180 then defines a first T-slot 184 ("locking slot") generally perpendicular to the second end 183 of the first slot segment 181. The first T-slot 184 may include a stop at one end while an opposed end may be in communication with a second slot segment 185 that extends in the direction of the distal end 172b of the tumbler 172 in a configuration substantially as described above regarding the first slot segment 181. The second slot segment 185 includes opposed first and second ends in like manner as well. A second T-slot 186 is perpendicular with the second slot segment 185 and in communication therewith. It is understood that whether the weight carriage 190 proceeds to a respective stop position or to a next slot segment is determined by a direction of rotation of the tumbler 172—which is according to program control and the processor 104 energizing the tumbler motor 174 accordingly.

It is understood that the pattern of a first slot segment 181, first T-slot 184, second slot segment 185, and second T-slot 186 may be repeated on said outer surface of said tumbler 172 at spaced apart intervals (such as a total of four times, six times, or more) so as to correspond with different club selections. The length of the vertical slots, however, may each have different lengths so as to proportionally correspond with different club sizes. In operation, the tumbler 172 is rotated by the tumbler motor 174 to an appropriate progression of indexed slot segments and then the weight carriage 190 is allowed to move by force of gravity along respective slot segments.

The rotational position of the tumbler 172 may be determined and the position thereof may be communicated to the processor 104 or other control circuitry. More particularly, at least one position sensor 178, such as an optical sensor, is situated in the open space of the head housing 140. The position sensor 178 may be a camera. Further, an position sensor interface 176 may be coupled or integrally connected to the proximal end 172a of the tumbler 172. The position sensor interface 176 may be a tab or panel having a plurality of position indicia thereon, each position indicia being indicative of a known rotational position of the tumbler 172. In use, programming instructions executed by the processor 104 are configured to utilize this position data to properly rotate the tumbler 172 so that the weight carriage 190 engages a correct first slot segment 181 in a gravity assisted movement. In some embodiments, the determination of the tumbler's position may be entirely mechanical while in others it may be electronic (such as a proximity or motion sensor) or optical.

An aspect of the simulation of actual game play involves the shaft housing 120 actually bending slightly during a vigorous swing motion. Preferably, the shaft housing 120 is constructed of a semi-rigid material such as TPE that will bend in a predetermined manner depending on the torque and angular momentum experienced by the shaft housing 120 when the club is swung. The flexible shaft housing construction is particularly preferred in the portion 125 extending between the head housing 140 and the grip member 130.

Actual game play may also be simulated by sound or vibration effects that appeal to a user's senses. The use of sensory effects is referred to as "haptic" design or simulated perception. In the present invention, a haptics member 200 is in communication with the shaft housing 120 and in data communication with the electronics module 160. It is understood that the haptics member 200 may be a vibration element or a sound-emitting element. The electronics module may also include sound output electronics. For instance, sound output such as a "swoosh" or a ball impact sound may be output to headphones via a wireless Bluetooth arrangement, the sound output being actuated when movement of the shaft housing 120 is detected and indicative of a swing.

Specifically, the sound may be associated with or indicative of precise movements of the shaft housing 120 as detected by the IMU. It is understood that the IMU may be configured to generate a vibration activation signal or a sound activation signal when said motion data and angular data are indicative that the shaft housing 120 is in motion and that the head housing 140 is proximate a ground surface or proximate a virtual golf ball. For instance, the sound may be associated with the speed and momentum of the shaft housing 120, i.e. the sound may increase in volume or vary in its tonality or resonance so as to simulate the reality of the sound of the swing of a real golf club. The sound electronics may also be simulative of an actual ball strike.

In use, a user may decide what size or type of golf club he wants to swing and, therefore, simulated by the golf club simulation apparatus 10. The club choice may be selected simply by holding the shaft housing 120 at an angle corresponding to predetermined club data stored in memory. The IMU is able to determine the angle of the shaft housing 120 as described above and publish appropriate feedback to the display 102. This process may be repeated until the user selects the desired club via the input member 100. Alternatively, the club choice may be selected by the user speaking a numeric or alphanumeric designation into the microphone or by pressing a respective input button. The club selection is then "published" on the digital display 42 and may be communicated to other components as described above.

Once the club is selected, the processor 104 may direct operation of the weight indexing assembly 170. Namely, the tumbler motor 174 may be energized to rotate the tumbler 172 so that the weight carriage 190 is allowed to move by force of gravity along the indexed slot network 180 as described above and change the weight distribution and "feel" of the head housing 140.

The user may then grasp the grip member 130 and prepare to swing the club in a manner similar to swinging a real golf club. Before swinging, however, the angle of the shaft housing 120 must be properly angled and the head housing 140 appropriately positioned relative to a simulated ball. Electronics associated with the IMU 161 determine angle data regarding the position of the shaft housing 120. When the circuitry or processor determines, that the shaft angle and club head face are properly positioned, the LEDs may be energized or images published to the digital display 102 to communicate to a user that the shaft housing 120 is ready to swing.

Then, when the user swings the apparatus 10, the sensors of the IMU 161 and, in an embodiment, an optics assembly, may collect swing data that enables a trajectory of a virtual ball or other object to be calculated and published to the display 102. Using wireless signal transmission, such as Bluetooth, the trajectory or other swing statistics may be transmitted to a remote device such as a laptop computer, remote display screen, or other remote electronic device. Various haptic sensations may also be actuated as described previously. It is understood that swinging the apparatus 10—having been adjusted to simulate the weight distributions and shaft bend characteristics of a respective club—provides an experience to the user very similar to swinging an associated real golf club.

It is understood that while certain forms of this invention have been illustrated and described, it is not limited thereto except insofar as such limitations are included in the following claims and allowable functional equivalents thereof. The principles and structures described herein may be applied to the movement of many other sports related devices and the simulation of many sports, games, and electronic gaming applications.

The invention claimed is:

1. A golf club simulation apparatus, comprising:
    an elongate shaft housing having opposed lower and upper ends and defining an interior area therebetween;
    a head housing coupled to said lower end of said shaft housing and defining an open space, a lower portion of said shaft housing situated in said open space;
    a battery;
    an input member coupled to an outer surface of said shaft housing and electrically connected to said battery, said input member being configured to receive club selection data; and
    a weight indexing assembly situated in said head housing that includes a tumbler rotatably coupled to said lower portion of said shaft housing and that includes a weight carriage situated in said club head housing;
    wherein said tumbler has an outer surface defining an indexed slot network, said weight carriage being in communication with said indexed slot network and configured for movement along said indexed slot network in a gravity assisted movement.

2. The golf simulation apparatus as in claim 1, wherein said battery is carried by said weight carriage.

3. The golf simulation apparatus as in claim 2, wherein said weight carriage includes auxiliary weighted members.

4. The golf simulation apparatus as in claim 1, wherein:
    said head housing includes an inner surface defining a groove extending longitudinally substantially between opposed ends of said head housing; and
    said weight carriage includes a tab configured to nest in said groove of said head housing so as to move selectively longitudinally along said groove but not rotationally relative to said groove.

5. The golf simulation apparatus as in claim 1, wherein said weight carriage includes a guide pin configured to selectively engage said indexed slot network so that said weight carriage is movable along said indexed slot network.

6. The golf simulation apparatus as in claim 5, wherein said indexed slot network includes:
    a first slot segment having a first end proximate a proximal end of said tumbler and extending in the direction of a distal end of said tumbler, said first slot segment having a second end opposite said first end;
    a first T-slot in communication with and generally perpendicular to said second end of said first slot segment;
    said first slot segment and said first T-slot being configured to receive said guide pin of said weight carriage when said weight carriage is engaged with said indexed slot network.

7. The golf simulation apparatus as in claim 6, wherein said indexed slot network includes:
    a second slot segment having a first end in communication with said first T-slot and extending in the direction of said distal end of said tumbler, said second slot segment having a second end opposite said first end;
    a second T-slot in communication with and generally perpendicular to said second end of said second slot segment;
    said first slot segment and said first T-slot being configured to receive said guide pin of said weight carriage when said weight carriage is engaged with said indexed slot network.

8. The golf club simulation apparatus as in claim 7, comprising:
    an electronics module positioned in said open space of said club head member and electrically connected to said battery;
    wherein said electronics module includes an inertial measurement unit that is configured to detect and generate rate of acceleration data and angular rotation data;
    a haptics member positioned in communication with said shaft housing and in data communication with said electronics module;
    wherein said inertial measurement unit is configured to generate a vibration activation signal when said rate of acceleration data and said angular rotation data are indicative that said shaft housing is in motion and that said club head member is proximate a ground surface; and
    wherein said haptics member is actuated upon receiving a haptics activation signal.

9. The golf club simulation apparatus as in claim 7, wherein:
    said first T-slot includes one end that is a terminal end configured to stop movement of said guide pin;

said second T-slot includes one end that is a terminal end configured to stop movement of said guide pin.

10. The golf simulation apparatus as in claim 1, further comprising:
an position sensor interface coupled to a proximal end of said tumbler, said position sensor interface having a plurality of position indicia thereon indicative of a rotational position of said tumbler;
at least one position sensor situated in said open space of said head housing that is configured to detect a respective position indicia on said position sensor interface.

11. The golf simulation apparatus as in claim 1, further comprising a motor positioned in said open space of said head housing that is electrically connected to said battery and to said input member, said motor being operatively coupled to said tumbler so as to rotate said tumbler when energized.

12. The golf simulation apparatus as in claim 1, comprising an electronics module coupled to said shaft housing and electrically connected to said battery, said electronics module including an inertial measurement unit ("IMU") that is configured to detect and generate rate of acceleration data and angular rotation data.

13. The golf simulation apparatus as in claim 12, wherein said inertial measurement unit includes:
at least one accelerometer configured to detect a rate of acceleration and generate motion data;
a gyroscope sensor configured to detect rotational movement and generate angle data;
a magnetometer sensor configured to detect spatial orientation and generate orientation data.

14. The golf simulation apparatus as in claim 13, comprising:
a haptics member in communication with said shaft housing and in data communication with said electronics module;
wherein said accelerometer and said gyroscope sensor are configured to generate a vibration activation signal when said motion data and said angle data are indicative that said shaft housing is in motion and that said head housing is proximate a ground surface;
wherein said haptics member is actuated upon receiving said vibration activation signal.

15. The golf simulation apparatus as in claim 13, wherein:
said at least one accelerometer is one of a linear accelerometer and an angular accelerometer configured to detect translational or non-gravitational acceleration forces; and
said gyroscope sensor is configured to detect pitch, yaw, and roll attributes of rotation.

16. The golf simulation apparatus as in claim 13, comprising circuitry in said electronics module configured to determine from said motion data and said angle data a trajectory of a virtual golf ball impacted upon an actual swing of said shaft housing.

17. The golf club simulation apparatus as in claim 13, comprising:
programming in said memory that, when executed by said processor, causes said processor to determine from said motion data and said angle data a trajectory of a hypothetical golf ball impacted upon an actual swing of said shaft housing;
programming in said memory that, when executed by said processor, causes said processor to publish data indicative of said determined trajectory to said digital display.

18. The golf club simulation apparatus as in claim 13, comprising an optics assembly, said optics assembly including an image sensor in data communication with said IMU and said processor and an image target member remote from said image sensor.

19. The golf club simulation apparatus as in claim 18, wherein:
said image sensor is a camera configured to take a predetermined number of snapshots per second and to generate image data associated with said snapshots;
wherein said image target is a landmark that, when captured by a respective snapshot by said image sensor, is indicative of a "moment" to be virtually impacted by a motion of said head housing.

20. The golf club simulation apparatus as in claim 19, comprising:
programming in said memory that, when executed by said processor, causes said processor to determine a trajectory of a hypothetical golf ball impacted upon an actual swing of said shaft housing using said motion data and said angle data from said IMU both before and after the "moment" determined by said optics assembly;
programming in said memory that, when executed by said processor, causes said processor to publish data indicative of said determined trajectory to said digital display.

21. The golf club simulation apparatus as in claim 18, further comprising programming in said memory that, when executed by said processor, causes said processor to determine, via said IMU and said optics assembly, if said angle of said shaft housing matches a predetermined angle associated with club selection data entered by a user and, if so, to publish an affirmative indicia to said digital display.

22. The golf simulation apparatus as in claim 18, comprising circuitry in said electronics module configured to determine from said rate of acceleration data and said angle data and data from said optics assembly a trajectory of a virtual golf ball impacted upon an actual swing of said shaft housing.

23. The golf club simulation apparatus as in claim 12, wherein said input member includes:
a digital display configured to provide a graphic user interface;
a data entry component configured to receive data supplied by a user;
a memory configured to store said user supplied data, predetermined golf club data, and programming instructions; and
a processor in data communication with said memory configured to execute said programming instructions.

24. The golf club simulation apparatus as in claim 23, comprising programming in said memory that, when executed by said processor, causes said processor to publish digital data indicative of a swing of said shaft housing to said digital display.

25. The golf club simulation apparatus as in claim 23, further comprising programming in said memory that, when executed by said processor, causes said processor to determine, via said IMU, if an angle of said shaft housing matches a predetermined angle associated with club selection data entered by a user and, if so, to publish an affirmative indicia to said digital display.

26. The golf club simulation apparatus as in claim 23, wherein:
said data entry component includes a microphone configured to receive audible data from a user, said microphone being in data communication with said processor;
programming in said memory that, when executed by said processor, causes said processor to convert said audible data into club selection data and to publish said club selection data to said digital display.

27. The golf club simulation apparatus as in claim 23, wherein said data entry component is one of a graphical user interface, club position data taken from said IMU and a membrane switch.

28. The golf club simulation apparatus as in claim 27, comprising:
   a grip member having a proximal end operatively coupled to said upper end of said shaft housing and a distal end displaced from said proximal end, said grip member defining an interior chamber;
   a membrane switch coupled to said grip member and configured to detect user input data imparted upon said grip member, said membrane switch in data communication with said processor of said input member.

29. The golf simulation apparatus as in claim 23, wherein said digital display is configured with restricted angle viewing such that content displayed on said digital display is only visible to a user at a predetermined angle of viewing.

30. The golf simulation apparatus as in claim 29, wherein said digital display includes a lenticular panel that causes said restricted angle viewing.

31. The golf club simulation apparatus as in claim 1, wherein said input member includes:
   a digital display configured to provide a graphic user interface;
   a data entry component configured to receive data from a user;
   a memory configured to store entered data, predetermined golf club data, and programming instructions;
   a processor in data communication with said memory configured to execute said programming instructions.

32. The golf club simulation apparatus as in claim 31, further comprising:
   a motor positioned in said interior area of said head housing that is electrically connected to said battery and to said input member, said motor being operatively coupled to said tumbler so as to rotate said tumbler when energized;
   programming that, when executed by said processor, causes said processor to:
      receive club selection data via said input member;
      energize said motor to rotate said tumbler so as to cause said weight carriage to engage said indexed slot network according to said club selection data.

33. The golf club simulation apparatus as in claim 32, wherein said indexed slot network includes:
   a first slot segment having a first end proximate a proximal end of said tumbler and extending in the direction of a distal end of said tumbler, said first slot segment having a second end opposite said first end;
   a first T-slot in communication with and generally perpendicular to said second end of said first slot segment;
   said first slot segment and said first T-slot being configured to receive a guide pin of said weight carriage when said weight carriage is engaged with said indexed slot network.

34. The golf simulation apparatus as in claim 1, comprising a grip member having a proximal end operatively coupled to said upper end of said shaft housing and a distal end displaced from said proximal end, said grip member defining an interior chamber.

35. The golf simulation apparatus as in claim 1, wherein said shaft housing has a semi-flexible construction and is configured to bend a relative amount when said shaft housing is moved in a swing motion.

* * * * *